United States Patent Office 3,777,005
Patented Dec. 4, 1973

3,777,005
METHOD OF REFINING NONFERROUS SULFIDE, ARSENIDE AND ANTIMONIDE MINERAL SUBSTANCES
Johannes Gerlach and Eberhard Gock, Berlin, Germany, assignors to Metallgesellschaft Aktiengesellschaft, Frankfurt am Main, Germany
No Drawing. Filed Sept. 27, 1971, Ser. No. 184,228
Claims priority, application Germany, Sept. 28, 1970, P 20 47 609.9; Dec. 15, 1970, P 20 61 652.8; July 30, 1971, P 21 38 143.1
Int. Cl. C01g 3/00
U.S. Cl. 423—27                    13 Claims

ABSTRACT OF THE DISCLOSURE

Nonferrous metal sulfides, antimonides and arsenides in mineral crystalline form, e.g. as ore, concentrates and metallurgical tailings, byproducts and waste materials, are comminuted, in for example, a vibrating mill by impact techniques (vibrating impact mill) until the X-ray diffraction or interference intensity is reduced, e.g. to a ratio of comminuted intensity to original intensity of less than 0.8. The comminuted product is then treated in a single step with oxygen and a lixiviant for recovery of the nonferrous metal or a salt thereof. The latter is found in solution in the aqueous phase.

(1) FIELD OF THE INVENTION

Our present invention relates to a method of or a process for the refining or recovery of nonferrous metals, especially from crystalline mineral substances containing the sulfides, arsenides and/or antimonides of the nonferrous metals. More particularly, the invention relates to a process for recovering nonferrous metals, in the elemental or metallic state, or as salts, from crystalline ores, ore concentrates and metallurgical intermediates, byproducts, tailings and waste products.

(2) BACKGROUND OF THE INVENTION

Numerous methods have been proposed heretofore for the recovery of nonferrous metals, such as zinc and copper, from mineral and especially crystalline systems containing the non-ferrous metals in the form of sulfides, arsenides or antimonides. Other recovery systems for extracting nonferrous metals from ores, ore concentrates and metallurgical intermediates, byproducts, tailings or waste products have also been suggested and these can be broadly classified in two groups. In one group are the roasting and pyrometallurgical processes in which comminuted mineral substances, such as the ores, ore concentrates and metallurgical intermediates, are subjected to high temperatures in particular gaseous environments to yield products which are free from undesirable elements and from which the nonferrous metals can be separated or containing the nonferrous metals in a usable state. In the other major group of processes, practiced following or without a pyrometallurgical treatment, are the hydrometallurgical processes in which the mineral substances are treated with an acidic or basic lixiviant or liquor, sometimes in the presence of an oxidizing gas to oxidize the metal and render it soluble in the liquid phase. The metal or salt thereof can be recovered from the liquid phase by evaporation, precipitation or other conventional chemical techniques.

Prior to methods of both groups, the mineral systems are generally comminuted in ball-mill and abrasion-type grinding installations, with or without a prior flotation or other gross-separation process, to a particle size suitable for the pyrometallurgical or hydrometallurgical treatment. All of these prior-art systems have been found to be disadvantageous on one or another ground. For example, most hydrometallurgical treatments known heretofore require extensive treatment times in which the mineral material must remain in contact with the liquid phase and complicated, expensive or inconvenient pre-treatments of the material to render it suitable for metallurgical processes. Pyrometallurgical methods are characterized by high capital expenditure, environmental contamination, loss of desirable substances, etc. By way of example, we may mention the treatment of mineral substances containing the noble metals with cyanide solutions, the simultaneous treatment of sulfidic ores with an acid or base and with oxygen, or the pretreatment of sulfidic and like compounds with an oxidizing medium, prior to acidic or basic leaching. The particular solutions employed are, of course, determined by the gangue-forming materials accompanying the nonferrous metal compounds of interest. Hence, for the recovery of copper from malachite or azurite, which contain basic gangue-formers, it has been the practice to use basic lixiviants such as alkali hydroxides, ammonia and salts thereof. Fused carbonate systems, followed by leaching with ammonia or ammonium carbonate at elevated temperatures, have also been proposed. These systems generally require comminution of the mineral matter by grinding and, possibly, a preliminary roasting of sulfur. Dilute and concentrated sulfuric acid have been used as lixiviants especially for the recovery of zinc and here too a grinding of the mineral matter in a ball mill is the common practice.

In general, the recovery of nonferrous metals, especially copper and zinc from sulfides, arsenides and antimonides thereof, is slow with conventional processes, the yields are relatively low, the treatment times excessive or the pretreatment requirements considerable and expensive. Considerable effort has, therefore, been expended in attempting improvements in this field.

(3) OBJECTS OF THE INVENTION

It is the principal object of the present invention to provide an improved process for working up or treating mineral substances, especially the sulfides, arsenides and antimonides or nonferrous metals such as zinc and copper whereby the aforementioned disadvantages can be obviated.

Still another object of the invention is to provide a method of recovering nonferrous metals from ores, ore concentrates and metallurgical intermediates containing same in the form of the sulfide, arenside and/or antimonide, in relatively high yield, with short treatment times and more economically and efficiently than has been possible heretofore.

(4) SUMMARY OF THE INVENTION

These objects and other which will become apparent hereinafter, are attained, in accordance with the present invention, which is based upon our surprising discovery that it is possible to increase sharply the rate at which nonferrous metals can be extracted from crystal mineral substances containing same in the form of the sulfide, arsenide or antimonide, when the crystalline substance is comminuted by impact techniques designed to fracture and/or distort the crystal lattice during comminution. According to the present invention, therefore, a sulfidic, arsenidic or antimonidic nonferrous metal ore, ore concentrate or metallurgical intermediate is subjected to impact comminution in a vibrating mill or the like to reduce the X-ray diffraction or interference intensity so that the ratio of the intensity after comminution to the intensity prior to comminution is at most 0.8, the comminuted product being thereafter subjected to treatment with an acidic lixiviant in the presence of oxygen in a single step.

Following impact milling, according to the present invention, the comminuted material is subjected to treatment in a liquid (aqueous) phase with acid under oxidizing conditions in a single step for a period and at a temperature sufficient to solubilize substantially all of the nonferrous metal, the latter being recovered as desired from the liquid phase by conventional processes. According to an important feature of the invention, the comminuted material is treated with substantially stoichiometric quantities of the acid simultaneously with oxidation at atmospheric or superatmospheric pressure, the oxidizing atmosphere being ambient air, oxygen-enriched air or oxygen.

While we do not wish to be bound to any theory in this regard, we believe that this surprising result obtained from the impact milling of the crystalline mineral substances derives from the fact that the impact milling not only comminutes the mineral substances but also mechanically disturbs or affects the lattice structure so as to render the mineral substances more susceptible to oxidizing chemical attack by the leaching solution. In other words, there appears to be a strong stressing, distortion or defect-formation in the crystalline particles resulting from impact milling which is not similar or analogous to the results obtained by abrasive-type or crushing comminution as results with pin or ball mills. This difference is critical to the expeditious chemical attack produced by the acid in the single-step solubilization of the nonferrous metals in the presence of oxygen.

While the lixiviant which may be used is preferably sulfuric acid, we have found that other acids and acidic solutions may be exploited. For example, hydrochloric acid, iron-salt acidic solutions and waste acids from other processes, such as pickling baths, may be used.

According to a most important feature of the invention, the impact comminution of the mineral substances is carried out for a period sufficient to reduce the X-ray diffraction or crystal-plane reflection intensity to a level below $I/I_0 = 0.8$ and preferably to an intensity ratio of 0.7 or less. We have found that X-ray diffraction intensity measurements provide a suitable gauge of the degree of impact comminution, crystal stressing or distortion, etc. which is essential to the present invention. Apparently, when X-ray diffraction intensity readings of powder samples of the mineral substances or single-crystal samples of the mineral substances are evaluated, the intensity of the material prior to impact milling, evaluated as described below, is substantially greater and the line width substantially smaller than is the case after impact comminution. X-ray diffraction intensity and line-width measurements result, as is well known, from the reflection of X-rays by the crystal planes of a substance and the various lines and line intensities are characteristic of the nature of the planes, their spacing and regularity. Consequently, as impact milling distorts the crystal structure, the individual line intensity and hence the intensity of the X-rays reflected from the crystalline planes is reduced, while the line width is increased. For the purposes of the present invention, the intensity I represents the X-ray diffraction intensity summed over the diffraction pattern or Bragg lines or those of selected crystal planes for the impact-comminuted material while the intensity $I_0$ for the raw material prior to impact milling will be the equivalent diffraction-line intensity for the material prior to impact-milling processing in accordance with the invention, but in the comminuted state as derived from the customary crushing operations to bring the mineral substances to a granulometry or fineness of the order of magnitude used for flotation concentration of mineral substances.

As noted earlier, the reduction in intensity is accompanied by a widening of the interference-pattern lines.

The measurement of the intensity of the interference lines and, therefore, the determination of the appropriate degree of impact milling can be made in accordance with conventional X-ray diffraction considerations. Attention is directed especially to chapter 9, pp. 1–40, chapter 12, pp. 1–12, chapter 16, pp. 1–20, and chapter 17, pp. 1–18 of the Handbook of X-rays, edited by Kaelble, McGraw-Hill Book Company, New York, 1967, and the references therein cited. In practice, we prefer to determine intensity by the methods described by H. Neff in Grundlagen und Anwendung der Röntgen-Feinstruktur-Analyse by Oldenbourg, Munich (Germany), 1962, chapter 10 and by R. Glocker, Materialprüfung mit Röntgenstrahlen, Springer-Verlag, Berlin, 1971, chapter VI, sections 21 and 26.

The X-ray analysis is carried out with the Kristalloflex III, X-ray goniometer using a proportional counting tube as the radiation detector (see also chapter 3 of the Handbook of X-rays), an X-ray tube with a cobalt anticathode (see chapter 2 of the Handbook of X-rays) and a Fe-filter ahead of the detector tube for elimination of background. The half-maximum line breadth (defined in chapter 17 of the Handbook of X-rays) of the X-ray crystal plane reflections is measured from the graphed spectrum while the measurements of the integrated intensities are obtained by a pulse counter operating over the desired $\theta$ angle of the instrument.

The powder samples are pressed into a sample carrier having a central hole with a diameter of 20 mm. and placed in the sample support of the goniometer.

The half-maximum line widths and intensities of the following crystal plane reflections are measured:

$$(h\ k\ l) = (112)$$
$$(220) + (024)$$
$$(040) + (008)$$
$$(244) + (228)$$

With increasing duration of impact milling, a sharp widening of the lines is detected so that a separation of the double reflection lines attributable to the crystal planes (220) and (024), (040) and (008), (224) and (244) no longer is detected and the intensity of a single widened line is measured for both. The calculations of the change in line width are carried out in accordance with the treatment of Kochendörfer [1] while the effect of line widening is treated in accordance with Brasse and Möller [2] while the influence of the penetration of X-rays into the sample is evaluated by the formulas of Zehender and Kochendöfer [3].

The following relationships will be apparent with respect to $b_{1/2}$, the half-maximum line width:

$$b_{1/2}/\text{tg } \theta = f(\theta),\ b_{1/2} \cdot \cos \theta = f(\theta),$$

$$b^2_{1/2} \cdot \cos^2 \theta = f(\sin^2 \theta)$$

and $$b_{1/2} \cdot \cos \theta = f(\sin \theta)$$

is graphically determined.

These relationships, and those of citations [4,5] supported by our experimental results, show that with increasing treatment time in the impact mill, between ½ hour and 3 hours, correspond to increasing lattice distortion or disruption. A treatment of 5 hours in a ball mill, however, does not yield a lattice disruption to the extent obtained with only ½ hour of treatment in the impact mill.

The integrated or summed intensity of all of the X-ray reflections is reduced with increasing impact-mill treatment duration. The intensity loss is a function of the Bragg angle and demonstrates significant disturbance of the lattice structures. [5,6] An equivalent disruption is not found with 5 hour or longer treatments in a ball mill.

It is interesting that an impact-milled specimen, treated for 3 hours, when placed in an argon stream for a period

---

[1] A. Kochendörfer, Z. Krist., 105 (1944), 393–480.
[2] F. Brasse and H. Möller, Arch. Ehw., 29 (1958), 757–771.
[3] E. Zehender and A. Kochendörfer, Phys. Z., 45 (1944), 93–108, cited in (²).
[4] H. Neff. Grundlagen der Anwendung der Röntgenfeinstruckturanalyse, R. Oldenbourg, Munich (1959).
[5] R. Fricke, Z. Elecktrochem., 46 (1940), 491–500.
[6] R. Glocker, Materialprüfung mit Röntgenstrahlen, 5th ed., Springer-Verlag, Berlin, Heidelberg, New York (1971).

of 3 hours at 400° C. is healed and the increased intensity and reduced line width are nearly restored.

The effect of impact-milling upon the crystal structure, of course, is dependent upon the type of material and the form in which it is available, the construction and efficiency of the impact mill and the duration of milling. With increasing impact-milling duration, the leaching speed increases so that one can select the milling and leaching speeds in an optimum interrelationship. When longer leaching times are desired, shorter milling periods may be used and vice versa. In general, it is advantageous to keep the leaching time considering the tank volume, relatively short. Preferably the milling is carried out such that the X-ray intensity ratio of the substances following impact-milling to the substance prior to such milling is less than 0.7.

According to another feature of the invention, the nonferrous metal content is determined and the mineral substances are treated with sulfuric acid at an elevated temperature, e.g. between 60° C. and the boiling point of the liquid phase with a stoichiometric quantity of sulfuric acid. Of course, apart from the impact-milling duration, the leaching temperature and the oxygen partial pressure determine the leaching time. With increasing temperature and with increasing oxygen partial pressure, the leaching speed increases. Advantageously the leaching process is carried out at a temperature above 60° C. but below the melting point of sulfur, preferably between 80° C. and 110° C. Increasing oxygen partial pressures are desirable for the reasons indicated and we prefer to use an oxygen partial pressure between 1 and 50 atmospheres gauge (atm. g.). When the starting materials are nickel and zinc sulfides, the preferred oxygen partial pressures are between 1 and 25 atm. g. while with copper-containing substances, the pressure should be between 10 and 50, preferably 20 to 40 atm. g.

An important concept of the present invention resides in the fact that the leaching operation is carried out in a single step, i.e. the leaching process involves both the physical attack of the liquid phase upon the mineral substances as well as a chemical attack thereon. It is not necessary to resubject the mineral substances during or after leaching to further milling, intervening heating or the return of any substantial residues to a milling or repeated leaching phase. The lixiviant can be used to treat the mineral substances continuously or intermittently and we may pass the lixiviant and mineral substances step by step in countercurrent or in concurrent flow through agitator vessels in cascade.

As already noted, the sulfuric acid is supplied to the lixiviant practically stoichiometrically with respect to the nonferrous metal content so that the waste liquor contains only minor quantities of free sulfuric acid. This liquor has a pH between 1.0 and 3.5. Of course, when the mineral substances contain other substances which are sulfuric acid consumers, they must be considered in determining the stoichiometric quantity of sulfuric acid which is required. Also it should be born in mind that minor quantities of sulfuric acid may be made by transformation of the sulfidic components in situ. By maintaining the excess of sulfuric acid as small as possible, one is able to reduce the iron content which would otherwise appear in solution. In a preferred embodiment of the invention, the impact-milling is carried out in the presence of a milling assist, e.g. quartz sand, which has been found to reduce the total milling time. The quartz sand may be added in amounts ranging between 1 and 25% of the mineral substances. While the invention has been carried out most effectively with chalcopyrite, numerous other minerals have been found to be suitable and the following are listed only by way of example: sphalerite (ZnS), bornite ($Cu_5FeS_4$), chalcosine ($Cu_2S$), covelline (CuS), enargite ($Cu_3AsS_4$), tetraedrite ($Cu_3SbS_{3-4}$), millerite (NiS), pentlandite ($Ni, Fe)_9S_8$), rammelsbergite ($NiAs_2$), breithauptite (NiSb), jaipurite (CoS), cobaltine (CoAsS), modderite (CoAs), galenite (PbS), lengenbachite $$(7PbS \cdot 2As_2S_3)$$

or geokronite ($5PbS \cdot AsSbS_3$).

Of course analogous complex mineral substances and conglomerates, combinations and the like of similar minerals may be used effectively.

(5) SPECIFIC EXAMPLES

Example I

Chalcopyrite concentrate ($CuFeS_2$) with a brass-yellow color, tetragonal crystalline configuration, a Mohs hardness of substantially 3.5 to 4, a black streak test and a specific gravity of 4.1 to 4.3 is subjected to impact milling with an impact mill of the vibration type described at pp. 8–26 ff. of Perry's Engineers' Handbook, 4th Ed., McGraw-Hill Book Co., New York, 1963, for various periods of time as set forth in the following Table 1 to illustrate the relationship between milling time and leaching time.

After milling, the chalcopyrite concentrate was suspended in an amount of 200 grams per liter (g./l.) in water and was leached with 97 g./l. of sulfuric acid at 100° C. in an oxygen partial pressure of 25 atmospheres gauge (atm. g.). The chalcopyrite had approximately the following composition:

| | Percent by weight |
|---|---|
| Copper | 27.0 |
| Iron | 31.2 |
| Sulfur | 35.6 |
| Gangue and other nonferrous metals | 6.2 |

In the following table, column 1 represents the milling time in hours, column 2 represents the intensity ratio $I/I_0$ of the X-ray diffraction intensities as defined above and the last 3 columns show the copper recoveries for leaching periods of 1, 2 or 3 hours respectively. The recoveries are in terms of percent of copper extracted from the chalocopyrite.

TABLE 1

| Milling time (hrs.) | $I/I_0$ | Leaching time (hrs.) | | |
|---|---|---|---|---|
| | | 1 | 2 | 3 |
| 0 | 1.0 | .85 | 11.9 | 13.3 |
| 0.5 | 0.76 | 61.5 | 78 | 85.5 |
| 1 | 0.68 | 72.5 | 86.5 | 92.5 |
| 2 | 0.50 | 96.5 | 98.5 | 100 |
| 3 | 0.50 | 100 | | |

Example II

The process for copper recovery as described in Example I was carried out to determine the copper yield as a function of the oxygen partial pressure. The chalcopyrite mill concentrate, in a suspension of 200 g./l. with 97 g./l. of sulfuric acid at 100° C. was milled for 3 hours in a vibrating impact mill to an X-ray diffraction intensity ratio $I/I_0$ of 0.50. The Table 2 we have shown at oxygen partial pressure in atm. g. in the first column and the results obtained with leaching times of 1, 2 and 3 hours respectively in the next 3 columns. Again the percentage by weight of copper recovery is listed in the table.

TABLE 2

| Oxygen partial pressure (atm.) | Leaching time (hrs.) | | |
|---|---|---|---|
| | 1 | 2 | 3 |
| 10 | 79.1 | 93.4 | 98.9 |
| 25 | 99.8 | | |

Example III

The relationship between the leaching temperature and other parameters of the system according to the present invention is determined at an oxygen partial pressure of 10 atm. g. with a chalcopyrite of the following compositions:

|  | Percent by weight |
|---|---|
| Copper | 18.4 |
| Iron | 27.3 |
| Sulfur | 37.6 |
| Gangue and other nonferrous metals | 16.7 |

The chalcopyrite is comminuted in an impact mill as previously described for a period of 3 hours, and in a solids concentration of 150 g./l., is leached with 67 g./l. of sulfuric acid. The X-ray diffraction intensity ratio $I/I_0$ was 0.5. In Table 3, we have shown the temperature in degree centigrade and the yield in percentage by weight of copper for leaching periods of 10, 20 and 60 minutes.

TABLE 3

| Temperature (° C.) | Leaching time (min.) | | |
|---|---|---|---|
|  | 10 | 20 | 60 |
| 60 | 72 | 85 | ca. 100 |
| 80 | 93 | ca. 100 |  |
| 100 | 97 | ca. 100 |  |

Example IV

The results obtained with a chalocopyrite of Example I and a chalocopyrite having the following composition were compared:

|  | Percent by weight |
|---|---|
| Copper | 26.7 |
| Iron | 27.1 |
| Sulfur | 31.1 |
| Gangue and other nonferrous metals | 15.1 |

The milling was carried out for 2.5 hours and the products were leached for periods of 90 minutes and 180 minutes at a temperature of 100° C. with an oxygen partial pressure of 10 atm. g. With a solids concentration of 200 g./l. and a sulfuric acid concentration of 97 to 108 g./l. The results are illustrated in Table 4 for the products of a ball mill and an impact mill under otherwise similar conditions.

TABLE 4

| Starting material | Leaching time (min.) | Comminution device | |
|---|---|---|---|
|  |  | Ball mill | Impact mill |
| Above-named concentrate with 26.7% copper | 90 | 54.3 | 99.8 |
| Concentrate of Example I | 180 | 51.6 | ca. 100 |

From the foregoing table it will be apparent that substantially identical results are obtained with the two concentrates and that in approximately equal treatment time, the use of the impact mill almost doubles the copper yield.

Example V

The method of the invention was carried out with nonferrous metal mineral concentrates of the following compositions.

(a) Sphalerite:
|  | Percent by weight |
|---|---|
| Zinc | 53.6 |
| Iron | 2.0 |
| Sulfur | 30.8 |
| Gangue and gangue-like substances | 13.6 |

(b) Pentlandite:
|  | Percent by weight |
|---|---|
| Nickel | 19.2 |
| Iron | 32.4 |
| Cobalt | 0.5 |
| Copper | 2.1 |
| Sulfur | 30.4 |
| Gangue and gangue-like substances | 15.4 |

(c) Fahlore:
|  | Percent by weight |
|---|---|
| Copper | 45.8 |
| Antimony | 29.0 |
| Gangue and gangue-like substances | 1.8 |

In each case, the concentrate was impact-milled for the period stated in Table 5 and leached at 80° C. with a solids concentration as given in the third column of the table, a sulfuric acid concentration as indicated in the fifth column for a period stated in the sixth column and under an oxygen partial pressure as specified in the fourth column of the table. Substantially total recovery of the nonferrous metals is obtained within the leaching periods given in the last column.

TABLE 5

| Starting material | Milling time (hrs.) | Solids concentration (g./l.) | O₂ partial pressure (atm.) | Sulfuric acid concentration (g./l.) | Leaching time (min.) |
|---|---|---|---|---|---|
| Sphalerite | 1 | 150 | Normal pressure | 145 | 25 |
| Pentlandite | 1 | 150 | do | 80 | 50 |
| Fahlore | 3 | 50 | 10 | 35 | 45 |

Example VI

A chalcopyrite concentrate containing

|  | Percent by weight |
|---|---|
| Copper | 18.4 |
| Iron | 27.3 |
| Sulfur | 37.6 | the balance insolubles and water of crystallization is comminuted in an impact mill in the presence of 10% by weight quartz sand for a period of 3 hours. Thereafter, the concentrate is leached with a 20% concentration sulfuric acid solution in an open stirred reactor at 80° C. with oxygen being available in the form of atmospheric air. The solids concentration was 150 g./l. After one hour of treatment with the liquid phase, 65% of the copper was solubilized. After 3 hours, substantially all of the copper was in solution.

Example VII

A chalcopyrite of the following composition is treated as described below:

|  | Percent by weight |
|---|---|
| Copper | 18.4 |
| Iron | 27.3 |
| Sulfur | 37.6 |

Balance insolubles and water crystallization.

The concentrate is comminuted in an impact mill to which quartz sand has been added as described in Example VI. The material is leached with a 20% solution of sulfuric acid at an oxygen partial pressure of 10 atm. g., a temperature of 80° C. and a solids content of 150 g./l. in an agitated autoclave. Analysis shows that, after 10 minutes, 93% of the copper content of the concentrate is solubilized and substantially all of the remainder is brought into solution within the next 10 minutes.

What is claimed it:

1. A method of separating nonferrous metals from a crystalline mineral substance selected from the group which consists of nonferrous-metal sulfide, arsenide and antimonide, comprising the step of impact-milling said substance to comminute the same and mechanically distort and disrupt the crystal structure thereof, said substance being impact-milled for a period sufficient to reduce the X-ray diffraction intensity $I$ of the milled substance with respect to the X-ray diffraction intensity $I_0$ of the substance prior to impact-milling to a ratio $I/I_0$ below about 0.8; and treating the impact-milled substance having a mechanically distorted and disrupted structure in a single step with a substantially stoichiometric quantity of an aqueous acid capable of solubilizing the nonferrous metal in the presence of an oxidizing atmosphere to solubilize the nonferrous metal therein.

2. The method defined in claim 1 wherein said substance is a copper ore, ore concentrate, or metallurigcal intermediate.

3. The method defined in claim 2 wherein $I/I_0$ is less than 0.7.

4. The method defined in claim 3 wherein said impact-milled substance is leached with a quantity of sulfuric acid substantially stoichiometrically equivalent to the nonferrous metal content thereof.

5. The method defined in claim 4 wherein said substance is milled in a vibrating mill.

6. The method defined in claim 5 wherein said impact-milled substance is leached with said acid at an elevated temperature between 60° C. and the melting point of sulfur.

7. The method defined in claim 6 wherein said temperature is between 80° C. and 110° C.

8. The method defined in claim 7 wherein said impact-milled substance is treated with said acid at an oxygen partial pressure betwen 1 and 50 atom. g.

9. The method defined in claim 8 wherein said oxygen partial pressure is between 1 and 25 atm. g.

10. The method defined in claim 8 wherein said oxygen partial pressure is between 10 and 50 atm. g.

11. The method defined in claim 10 wherein said oxygen partial pressure is between 20 and 40 atm. g.

12. The method defined in claim 8, further comprising the step of adding a milling assist to said substance during the impact milling thereof.

13. The method defined in claim 12 wherein said milling assist is quartz sand.

References Cited

UNITED STATES PATENTS

| | | | |
|---|---|---|---|
| 2,152,188 | 3/1939 | Heberlein | 423—28 |
| 3,241,950 | 3/1966 | Mackin et al. | 423—28 X |
| 3,632,308 | 1/1972 | Klein et al. | 423—28 |
| 2,847,300 | 8/1958 | Paull | 423—28 |

HERBERT T. CARTER, Primary Examiner

U.S. Cl. X.R.

241—5; 423—28, 41, 38, 98, 109, 150